(12) United States Patent
Edlitz

(10) Patent No.: US 11,230,133 B2
(45) Date of Patent: Jan. 25, 2022

(54) PULSED LIGHT EMITTING DIODE SINTERING

(71) Applicant: NANO DIMENSIONS TECHNOLOGIES LTD., Nes Ziona (IL)

(72) Inventor: Yochai Edlitz, Nes Ziona (IL)

(73) Assignee: Nano-Dimension Technologies Ltd., Nes Ziona (IL)

(*) Notice: Subject to any disclaimer, the term of this patent is extended or adjusted under 35 U.S.C. 154(b) by 0 days.

(21) Appl. No.: 16/604,901

(22) PCT Filed: Mar. 23, 2018

(86) PCT No.: PCT/US2018/024002
§ 371 (c)(1),
(2) Date: Oct. 11, 2019

(87) PCT Pub. No.: WO2018/175873
PCT Pub. Date: Sep. 27, 2018

(65) Prior Publication Data
US 2020/0376879 A1    Dec. 3, 2020

Related U.S. Application Data

(60) Provisional application No. 62/476,228, filed on Mar. 24, 2017.

(51) Int. Cl.
*B41M 7/00* (2006.01)
*B41J 11/00* (2006.01)
(Continued)

(52) U.S. Cl.
CPC .......... *B41M 7/0081* (2013.01); *B41J 11/002* (2013.01); *B41M 3/006* (2013.01);
(Continued)

(58) Field of Classification Search
CPC ..... C09D 11/107; C09D 11/326; C09D 11/38; C09D 11/322; C09D 11/101; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; B41J 11/0021; B41J 2/2107; B41J 2/01; B41J 11/002; B41J 2/0057; B41J 2/04586; B41J 2/1433; B41J 2/045; B41J 2/16538; B41J 25/001;
(Continued)

(56) References Cited

U.S. PATENT DOCUMENTS

2001/0046564 A1* 11/2001 Kotov ................... B82Y 40/00
427/430.1
2001/0052920 A1* 12/2001 Matsumoto ........ B41J 11/00214
347/102
(Continued)

*Primary Examiner* — Manish S Shah
(74) *Attorney, Agent, or Firm* — Guy Levi; The IP Law Firm of Guy Levi, LLC

(57) ABSTRACT

The disclosure relates to systems and methods for photonic sintering of conductive ink compositions with metal nanoparticles. Specifically, the disclosure relates to methods and systems for sintering ink compositions with metal nanoparticles using an illumination source comprising an array of pulsed light emitting diodes (LEDs).

17 Claims, 2 Drawing Sheets

(51) Int. Cl.
*B41M 3/00* (2006.01)
*C09D 11/037* (2014.01)
*C09D 11/322* (2014.01)
*C09D 11/38* (2014.01)
*C09D 11/52* (2014.01)

(52) U.S. Cl.
CPC .......... *C09D 11/037* (2013.01); *C09D 11/322* (2013.01); *C09D 11/38* (2013.01); *C09D 11/52* (2013.01)

(58) Field of Classification Search
CPC .. B41J 2025/008; B41J 2202/21; B41J 2/211; B41J 2/17; B41J 2/17593; B41J 2/2114; B41J 2/2117; B41J 2/2056; B41J 2/21; B41J 3/60; B41J 2002/012; B41J 2/04598; B41J 2/04588; B41J 2/04595; B41J 2/14275; B41J 2/1623; B41J 2202/00; B41J 2202/03; B41J 2/14201; B41J 11/0015; B41J 2/04581; B41J 2/055; B41J 2002/16502; B41J 25/34; B41J 25/003; B41J 25/312; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 7/0072; B41M 5/0017; B41M 5/0047; B41M 7/00; B41M 5/52; B41M 5/5218; B41M 5/5227; G02B 5/20; G02B 5/223; C08K 2003/2237; C08K 3/11
See application file for complete search history.

(56) References Cited

U.S. PATENT DOCUMENTS

| | | | | |
|---|---|---|---|---|
| 2002/0149660 | A1* | 10/2002 | Cleary | B41J 11/002 347/102 |
| 2003/0222961 | A1* | 12/2003 | Nakajima | B41J 11/002 347/102 |
| 2004/0114016 | A1* | 6/2004 | Yokoyama | B41J 11/002 347/102 |
| 2004/0189773 | A1* | 9/2004 | Masumi | B41J 11/002 347/102 |
| 2005/0099478 | A1* | 5/2005 | Iwase | B41J 11/002 347/102 |
| 2006/0007290 | A1* | 1/2006 | Oshima | B41J 11/002 347/102 |
| 2006/0192829 | A1* | 8/2006 | Mills | B41J 11/002 347/102 |
| 2006/0204670 | A1* | 9/2006 | Siegel | B41J 11/002 427/487 |
| 2010/0143591 | A1* | 6/2010 | Wu | C09D 11/38 427/256 |
| 2011/0287195 | A1* | 11/2011 | Molin | B05D 3/067 427/595 |
| 2012/0283349 | A1* | 11/2012 | Loccufier | G03F 7/027 522/14 |
| 2014/0065294 | A1 | 3/2014 | Ramanujan et al. | |
| 2014/0183582 | A1 | 7/2014 | Lee et al. | |
| 2014/0185282 | A1 | 7/2014 | Hsu et al. | |

* cited by examiner

PULSED LIGHT EMITTING DIODE SINTERING

CROSS REFERENCE TO RELATED APPLICATIONS

This patent application is a U.S. National Phase filing of commonly owned and pending PCT Application No. PCT/US18/24002, filed Mar. 23, 2018, which is based on and claims the benefit of the filing date of U.S. Provisional Patent Application Ser. No. 62/476,228, filed Mar. 24, 2017, both which are incorporated herein by reference in their entirely.

BACKGROUND

The disclosure is directed to systems and methods for photonic sintering of conductive ink compositions with metal nanoparticles. Specifically, the disclosure is directed to methods and systems for sintering ink compositions with metal nanoparticles using an illumination source comprising an array of pulsed light emitting diodes (LEDs).

Printed circuit boards are generally fabricated by lithography using extractive methods, for example etching. Such a fabrication method provides formation of conductive lines by placing a conductive film on a substrate with an acid resistant material (resist) coated only on the part corresponding to a circuit pattern and the unnecessary portion of the conductive film etched by dissolution-removing the portion of the conductive film where there are not circuits with a corrosion solution and thereby to leave only necessary conductive lines.

However, since the formation process of the laminate, the resist coating, resist etching and washing, and the like is complex, requiring many stages that often cannot be done continuously, manufacturing process requires substantial amount of time and production cost thus increase.

In addition, discharged solution generated during the manufacturing process can cause environmental issues, requiring on many occasions treatment such as neutralization and the like, which can also cause increase in manufacturing costs.

Some of these drawbacks can be partially solved using additive manufacturing process of circuit board by, for example, directly printing the circuit pattern using conductive ink on a substrate.

In additive manufacturing processes, conductive ink sintering may be largely divided into heat sintering and laser sintering. However, since commercially available heat sintering and laser sintering methods require high energy and a long sintering times, problems such as cost increase still persist.

There is therefore a need for a system and methods for using readily available energy sources that will cure some of the deficiencies described above.

SUMMARY

Disclosed, in various embodiments, are methods and systems for sintering ink compositions with metal nanoparticles using pulsed light emitting diodes.

In an embodiment provided herein is a method of sintering metal particle comprising: coating a substrate with a pattern of a composition comprising metal nanoparticles having a predetermined thickness; and exposing the coated pattern of metal nanoparticle composition to an array of pulsed light emitting diodes (LEDs) at a predetermined substrate velocity in a given direction.

In another embodiment, provided herein is a method of sintering metal particle comprising: coating a substrate with a pattern of a composition comprising metal nanoparticles having a predetermined thickness; and exposing the coated pattern of metal nanoparticle composition to an array of pulsed light emitting diodes (LEDs) at a predetermined substrate velocity in a given direction, wherein the LEDs are substantially monochromatic, emitting light at a wavelength corresponding to the metal nanoparticles' average size-dependent ($D_{2,1}$) surface plasmon resonance (SPR) peak wavelength.

In yet another embodiment, provided herein is a method of sintering metal particle comprising: coating a substrate with a pattern of a composition comprising metal nanoparticles having a predetermined thickness; and exposing the coated pattern of metal nanoparticle composition to an array of pulsed light emitting diodes (LEDs) at a predetermined substrate velocity in a given direction, wherein the LEDs are substantially monochromatic and the metal average nanoparticle size ($D_{2,1}$) corresponds to the peak wavelength light emission of the monochromatic LEDs, configured to produce surface plasmon resonance.

These and other features of methods and systems for sintering ink compositions with metal nanoparticles using an array of pulsed light emitting diodes, will become apparent from the following detailed description when read in conjunction with the figures and examples, which are exemplary, not limiting.

BRIEF DESCRIPTION OF THE FIGURES

For a better understanding of the methods and systems for sintering ink compositions with metal nanoparticles using pulsed light emitting diodes, with regard to the embodiments thereof, reference is made to the accompanying examples and figures, in which.

These and other features of the methods and systems for sintering ink compositions with metal nanoparticles using pulsed light emitting diodes, will become apparent from the following detailed description when read in conjunction with the figures and examples, which are exemplary, not limiting.

DETAILED DESCRIPTION

Provided herein are embodiments of systems and methods for sintering conductive ink compositions with metal nanoparticles using pulsed light emitting diodes.

In an embodiment, provided herein is a method of sintering metal particle comprising: coating a substrate with a pattern of a composition comprising metal nanoparticles having a predetermined thickness; and exposing the coated pattern of metal nanoparticle composition to an array of pulsed light emitting diodes (LEDs) at a predetermined substrate velocity in a given direction. Various methods are considered for coating the pattern on the substrate, these include, for example dip coating, rod coating, knife coating, blade coating, air knife coating, gravure coating, roll coating, slot coating, slide coating, curtain coating, Langmuir Blodgett coating, spray coating, spin coating, inkjet printing, paste deposition, and the like.

Using pulsed LEDs as described and claimed herein, instead of continuous LEDs can be advantageous, due to the ability of pulsed LEDs to heat only the top layer of the silver nanoparticles, without having high heat capacitance to overheat the dielectric surrounding the silver.

Additional feature of using LEDs, compared to wide band photonic source, tuning of the LEDs wavelength such that the silver nanoparticles absorbs the spectrum to a greater extent, than the surrounding dielectric material, would enable the selective heating and sintering of the metal (e.g. silver).

Furthermore, the pulsed LEDs in the methods and systems described herein, can be used regardless of Plasmons peak, so long as the metal nanoparticles or the conductive ink characteristics (Such as the solvent or additive pigment for example) have better absorbance than dielectric surroundings at the specific wavelength.

The LEDs used in the methods for sintering conductive ink compositions with metal nanoparticles can be, for example, substantially monochromatic. The LEDs can be configured to emit light at a wavelength which corresponds to the metal nanoparticles' average size-dependent ($D_{2,1}$) surface plasmon resonance (SPR) peak wavelength. It is understood, that the wavelength of the monochromatic LEDs can be tailor made for the particular metal of the conductive ink composition. The metal nanoparticles in the composition comprises: Silver (Ag), Gold (Au), Copper (Cu), Aluminum (Al), their salts, oxides, precursors or combination comprising the foregoing.

Figure 2:
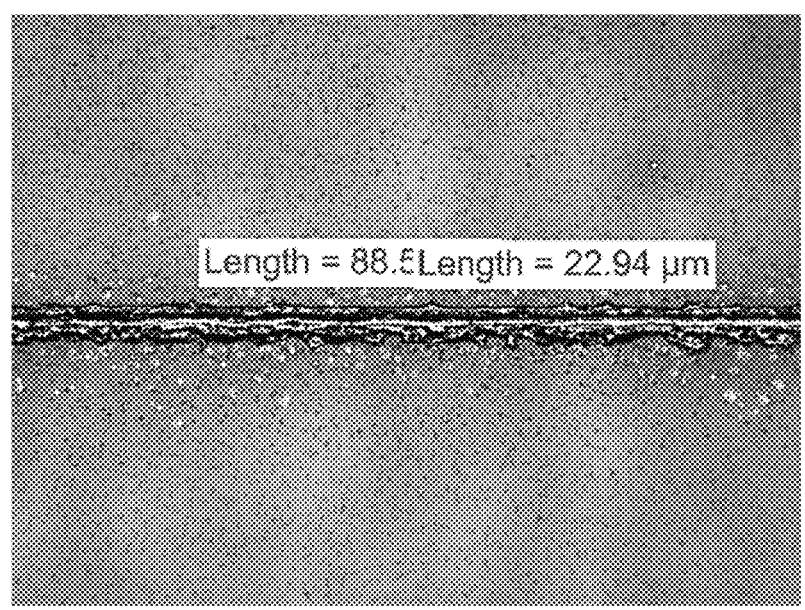
FIG. 2 is a photograph showing a conductive pattern sintered using the methods described and claimed.
Figure 4:
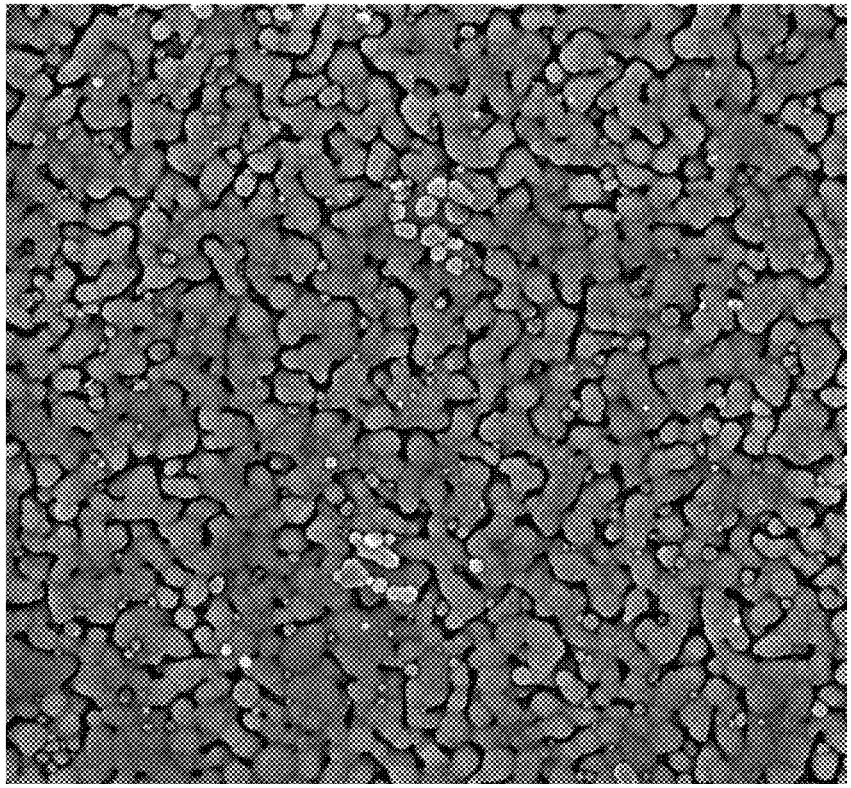
FIG. 4, depicts a sintered layer according to an embodiment of the methods described herein.

As used herein, regarding the use of pulsed LED to affect the sintering of the metallic composition pattern (see e.g., FIGS. 2, 4), the term "plasmon" refers to collective oscillation of free electrons on a metal surface (e.g., of the metal nanoparticles forming Plasmon Resonant Entity) that is excited by an external electric field such as the pulsed LED. Because electrons are electrically charged, polarization occurs due to the density distribution of free electrons that is caused by oscillation of electrons. A phenomenon in which that polarization and an electromagnetic field are combined is referred to as "plasmon resonance". The term "plasmon resonant entity" or "PRE" is used herein to refer to any independent structure exhibiting plasmon resonance characteristic of the structure, including (but not limited to) both plasmon resonant particles (PRPs) and combinations or associations of plasmon resonant particles such as the printed nanoparticles' pattern. A PRE may include either a single PRP or an aggregate of two or more PRPs which manifest a plasmon resonance characteristic when excited with electromagnetic energy (EMR). Furthermore, "Plasmon resonant particle" or "PRP" refers in another embodiment to a single piece or fragment of material, e.g., spherical particle, which elicits plasmon resonance when excited with electromagnetic energy. A plasmon resonant particle can be "optically observable" when it exhibits significant scattering intensity in the optical region, which includes wavelengths from approximately 320 nanometers (nm) to several microns. A plasmon resonant particle can be "visually observable" when it exhibits significant scattering intensity in the wavelength band from approximately 400 nm to 700 nm which is detectable by the human eye. Plasmon resonance is created via the interaction of incident light with basically free conduction electrons. In certain embodiment the metal nanoparticles or entities have dimensions, e.g., $D_{2,1}$ diameters of between about 25 and 600 nm, for example, between about 40 nm and about 300 nm.

The precursors used in certain of the compositions provided, can be those used in metal-organic decomposition compounds, for example silver oxalate, Copper(II) ethylene glycol carboxylates, aluminum-tri-sec-butoxide (Al(O-sec-Bu)$_3$) chemically modified with alkanolamines, and the like.

Figure 3:
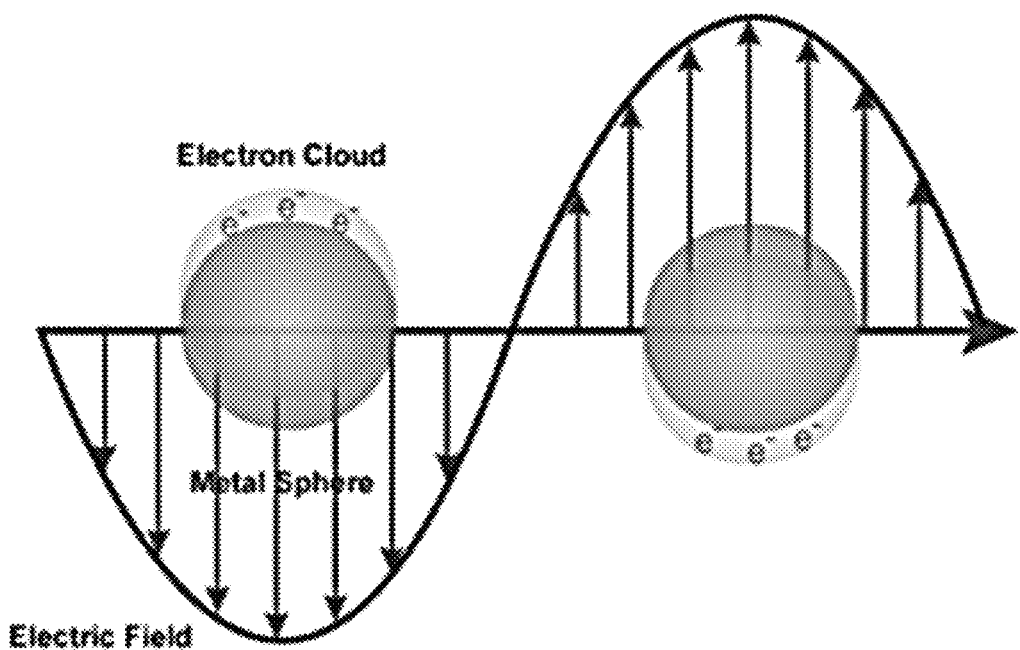
FIG. 3, is a schematic depicting collective longitudinal excitation of an electron gas on the surface a particle.

Conversely and in another embodiment, when using spherical silver nanoparticles, the SPR peak wavelength (e.g., of the monochromatic LEDs), can be tuned from 390 nm (violet light) to 1100 nm (NIR) by changing the average particle size (diameter, $D_{2,1}$) and the local refractive index near the particle surface (by using preselected solvents and/or other additives). Larger shifts of the SPR peak wavelength out into the Near infrared region of the electromagnetic spectrum can be achieved by producing silver nanoparticles with rod or plate shapes (in other words, having an aspect ratio >>1). Accordingly, and in an embodiment, the LEDs are substantially monochromatic and the metal average nanoparticle size ($D_{2,1}$) corresponds to the peak wavelength light emission of the monochromatic LEDs, configured to produce surface plasmon resonance. The term "plasmon", refers to quantized plasma oscillation, where plasma oscillation is a collective longitudinal excitation of free electron gas on the surface of the metal nanoparticle (see e.g., FIG. 3).

Figure 1A:
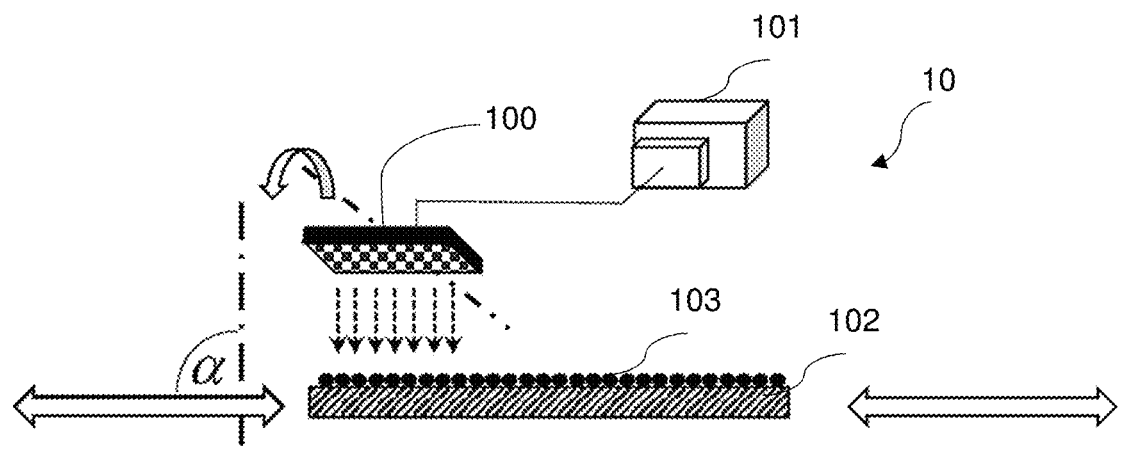
FIG. 1A is a schematic illustrating an embodiment of the systems enabling the methods described with FIG. 1B, illustrating an embodiment with adjustable angle LED array.
Figure 1B:
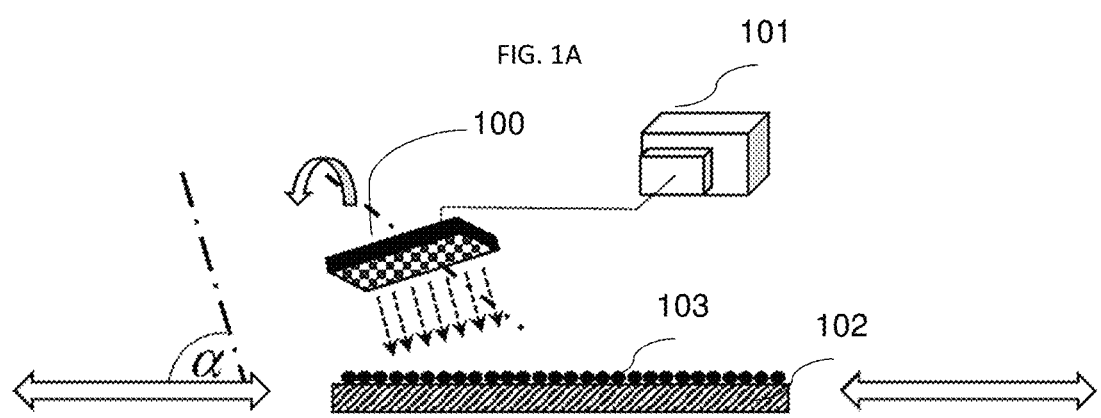

The pulsed LEDs can be a part of an illumination source comprising the array of LEDs, operably coupled to a power source and a pulse generator. The array may an assembly in communication with a pulse generator and have monochromatic LED lights with various wavelengths, for example, at 395 nm, 365 nm, or 540 nm and various combinations thereof can be used. Furthermore, and as illustrated in FIGS. 1A, 1B, array 100 can be tilted such that the angle of incidence α of the light to conductive pattern 103 on substrate 102, is not normal (in other words, see e.g., FIG. 1A—90° relative to the direction of substrate 102 motion). Furthermore, the substantially monochromatic LED in array 100, can emit light at a wavelength of between about 290 nanometers (nm) and about 3,500 nm. It should be noted, that the LEDs could be tuned for interaction with other additives as well as for example, water. Likewise, LED array 100 can be constructed with LED emissions targeted to various components of the ink, thus achieving preselected results.

As described; monochromatic, and/or partial spectrum LEDs, with either pulsed or continuous light from the array can be configured to be incident either normal or at an angle a (see e.g., FIG. 1B) onto printed ink compositions comprising metal nanoparticles that can be deposited on a substrate to form selectable conductive pattern. The optical energy can be converted (locally) into heat by the nanoparticles, resulting in rapid evaporation of the solvent present in the ink compositions and in increase in nanoparticle concentration, resulting in an increase in dynamic viscosity of the ink. In an embodiment, using LEDs at a wavelength corresponding to the metal's size dependent SPR peak, conventional nanoparticle sintering processes can result in faster densification of nanoparticle inks over large area substrates under lower temperature conditions (see e.g., FIG. 2).

As used herein, the term "array" can refer to any number of rows and columns, and could have equal numbers of LEDs in each row and column or different numbers of LEDs in some rows and columns. Furthermore, the LEDs can be arranged in rows and columns whereby in each row and/or column, the LED wavelength is different.

Number of factors can be incorporated to the systems facilitating the methods described and in an embodiment, the LED array can be coupled to a processor configured to control and enable the methods provided. The factors controlled by the processor can comprise, among others, light intensity in W/cm$^2$, substrate speed or velocity in mm/sec., substrate temperature, pulse frequency and pulse duration, angle of the array relative to the substrate, peak wavelength produced by the LED array acting as the illumination source for the SPR-augmented photonic sintering. For example, depending on the metal used in the metal nanoparticles, the application for the conductive ink, the average particle size, the refractive index of the ink, presence of photoinitiators, the thickness of the printed conductive pattern, the number of layers, and/or a combination of factors comprising one or more of the foregoing, the processor may be configured to control and change, various processing parameters.

For example; the LEDs used can be configured to provide light intensity of between about 16 Watt/cm$^2$ and about 10,000 W/cm$^2$, corresponding to about $10.9 \times 10^3$ lumens/cm$^2$ to about $6.83 \times 10^5$ lumens/cm$^2$ respectively. Likewise, the pulse frequency can be between about 1.0 kHz to about 10.0 MHz. The duration of exposure, can be controlled be the velocity of the substrate, which can be between about 1.5 mm/sec and about 15 m/sec. for example, 2.5 mm/sec, 4.0 m sec, 10 mm/sec, 12 m/sec or any velocity between and including the range limits.

In addition, the illumination source can be coupled to an axis (see e.g., FIG. 1B) that will allow the illumination source comprising the LED array to roll relative to the axis transverse to the direction of motion of the substrate, causing the angle between the array of pulsed light emitting diodes (LEDs) and the substrate to change to between about 5° and about 60° off normal (in other words, off vertical). Changing the angle of incidence can be used in an embodiment to control the heat generated and the resonance between the EMR source (pulsed LEDs) and the particle surface, thus affecting the heat generated by the particles.

Furthermore, the processor can also heat the chuck holding the substrate, thereby causing the substrate to arrive at a predetermined temperature. Heating the substrate may be beneficial in removing the solvent present in the conductive ink compositions used, increasing the fractional concentration of the nanoparticle and densifying, or increasing the dynamic viscosity of the ink, preventing spreading before SPR-augmented, photonic sintering using the LED array can commence. Accordingly and in an embodiment, the method of sintering conductive ink composition comprising metal nanoparticles can further comprise a step of heating the substrate to a predetermined temperature (e.g., configured to assist in removing solvents from the conductive ink composition) before the step of exposing the coated pattern of metal nanoparticles' composition to the illumination source. For example, the chuck can be heated such that the substrate is heated to a temperature of between 60° C. and about 300° C. The substrate can be configured to be removable once sintering is completed.

As indicated, the methods provided are implementable for traces of conductive ink compositions comprising metal nanoparticles resulting in densified (in other words, ink composition having increased viscosity), of a predetermined thickness, for example, between about 0.05 μm and about 150 μm, for example, 0.3 μm, 120 μm and the like.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the head(s) includes one or more head). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The term "coupled", including its various forms such as "operably coupled", "coupling" or "coupleable", refers to and comprises any direct or indirect, structural coupling, connection or attachment, or adaptation or capability for such a direct or indirect structural or operational coupling, connection or attachment, including integrally formed components and components which are coupled via or through another component or by the forming process (e.g., an electromagnetic field). Indirect coupling may involve coupling through an intermediary member or adhesive, or abutting and otherwise resting against, whether frictionally (e.g., against a wall) or by separate means without any physical connection.

Other sensors can be incorporated into the system, for example, image (visual) sensors (e.g., CMOS, CCD, for example to monitor ink color, drop shape/volume), microflow (or flow) sensors (e.g., EM based, Resonant feedback based, Pitot-based) viscosity sensors, timing sensors, conductivity sensors, or an array comprising one or more of the foregoing. The sensors, including the temperature sensors can provide data to a processor comprising memory having thereon computer-readable media with a set of executable instruction enabling the processor, being in electronic communication with a driver. The processor can further have a memory module with computer readable media stored thereon, comprising a set of instructions thereon configured to carry out the methods described herein, provide temperature controls, and the like.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly and in an embodiment, provided herein is a method of sintering metal particle comprising coating a substrate with a pattern of a composition comprising metal nanoparticles having a predetermined thickness; and exposing the coated pattern of metal nanoparticle composition to an array of pulsed light emitting diodes (LEDs) at a predetermined substrate velocity in a given direction, wherein (i) the LEDs are substantially monochromatic, emitting light at a wavelength corresponding to the metal nanoparticles' average size-dependent ($D_{2,1}$) surface plasmon resonance (SPR) peak wavelength, (ii) or alternatively the metal average nanoparticle size ($D_{2,1}$) corresponds to the peak wavelength light emission of the monochromatic LEDs, configured to produce surface plasmon resonance (in other words, in one embodiment LEDs' EMR emission wavelength is tuned to the particles' average area based particle size ($D_{2,1}$), while in another embodiment, the metal nanoparticles are-based average particle size is selected based on the LEDs predetermined EMR emission wavelength or a combination of both), wherein (iii) the metal nanoparticles in the composition comprises at least one of: Silver, Gold, Copper, Aluminum, their salts, oxides and precursors, wherein (iv) the substantially monochromatic LEDs emit light at a wavelength of between about 290 nanometers (nm) and about 1100 nm, (v) are configured to provide light intensity of between about 16 Watt/cm and about 10,000 W/cm$^2$, wherein (vi) the array of pulsed light emitting diodes (LEDs) is configured to emit light pulses at a frequency of between about 1.0 kHz and about 10.0 MHz, wherein (vii) the substrate velocity through the array is between 2 mm/sec and about 10 mm/sec, wherein (viii) the angle between the array of pulsed light emitting diodes (LEDs) and the substrate is between about 5° and about 60° off normal, the method further (ix) comprising a step of heating the substrate to a predetermined temperature before the step of exposing the coated pattern of metal nanoparticles' composition, the substrate (xi) is heated to a temperature of between 60° C. and about 200° C., and (xi) is removable, wherein (xii) the thickness of the coating is between about 0.3 μm and about 15 μm, wherein (xiii) the composition comprising metal nanoparticles further comprises a photoinitiator and a solvent, and (xiv) the photoinitiator is at least one of (in other words, and/or) 2-isopropyl thioxanthone, 2,4-Diethyl Thioxanthone, ethyl-4-dimethylamino-benzoate (EDMAB), 2-isopropylthioxanthon, 2-benzyl-2 dimethylamino-morpholinophenyl)-butanone-1, dimethyl-1,2-diphenyl lehan-1-one, benzophenone or a combination thereof, wherein (xv) the step of exposing the coated pattern of metal nanoparticle composition to an array of pulsed light emitting diodes (LEDs) is preceded or occurs simultaneously with a step of removing the solvent.

In another embodiment, provided herein is an ink jet printer, comprising: a print head disposed on a print carriage in communication with a processor, adapted to form the pattern of the coating composition comprising the metal nanoparticles provided hereinabove to the substrate; and the array of pulsed light emitting diodes (LEDs), the printing carriage configured to move the substrate at the predetermined velocity, and wherein (xvi) the array of pulsed light emitting diodes (LEDs) is coupled to a frame configured to provide variable angle off normal between the array of pulsed light emitting diodes (LEDs) and the substrate, wherein (xvi) the array of pulsed light emitting diodes (LEDs) is coupled to a frame configured to provide variable angle off normal between the array of pulsed light emitting diodes (LEDs) and the substrate.

While in the foregoing specification the systems and methods for photonic sintering of conductive ink compositions using an illumination source comprising an array of pulsed light emitting diodes (LEDs), and many details are set forth for purpose of illustration, it will be apparent to those skilled in the art that the disclosure is susceptible to additional embodiments and that certain of the details described in this specification and as are more fully delineated in the following claims can be varied considerably without departing from the basic principles of this disclosure.

What is claimed:

1. A method of sintering metal particle comprising
   a. coating a substrate with a pattern of a composition comprising metal nanoparticles having a predetermined thickness; and
   b. exposing the coated pattern of metal nanoparticle composition to an array of pulsed light emitting diodes (LEDs) at a predetermined substrate velocity in a given direction,
   wherein the LEDs are substantially monochromatic, emitting light at a wavelength corresponding to the metal nanoparticles' average size-dependent ($D_{2,1}$) surface plasmon resonance (SPR) peak wavelength.

2. The method of claim 1, wherein the LEDs are substantially monochromatic and the metal average nanoparticle size ($D_{2,1}$) corresponds to the peak wavelength light emission of the monochromatic LEDs, configured to produce surface plasmon resonance.

3. The method of claim 2, wherein the metal nanoparticles in the composition comprises at least one of: Silver, Gold, Copper, Aluminum, their salts, oxides and precursors.

4. The method of claim 2, wherein the substantially monochromatic LEDs emit light at a wavelength of between about 290 nanometers (nm) and about 1100 nm.

5. The method of any one of claim 1, wherein the LEDs are configured to provide light intensity of between about 16 Watt/cm and about 10,000 W/cm$^2$.

6. The method of claim 2, wherein the array of pulsed light emitting diodes (LEDs) is configured to emit light pulses at a frequency of between about 1.0 kHz and about 10.0 MHz.

7. The method of claim 1, wherein the substrate velocity through the array is between 2 mm/sec and about 10 mm/sec.

8. The method of claim 1, wherein the angle between the array of pulsed light emitting diodes (LEDs) and the substrate is between about 5° and about 60° off normal.

9. The method of claim 1, further comprising a step of heating the substrate to a predetermined temperature before the step of exposing the coated pattern of metal nanoparticles' composition.

10. The method of claim 9, wherein the substrate is heated to a temperature of between 60° C. and about 200° C.

11. The method of claim 1, wherein the thickness of the coating is between about 0.3 μm and about 15 μm.

12. The method of claim 1, wherein the substrate is removable.

13. The method of claim 1, wherein the coated pattern composition of the metal nanoparticles further comprises a photoinitiator and a solvent.

14. The method of claim 13 wherein the photoinitiator is 2-isopropyl thioxanthone, 2,4-Diethyl Thioxanthone, ethyl-4-dimethylaminobezoate (EDMAB), 2-isopropylthioxanthon, 2-benzyl-2 dimethylamino-morpholinophenyl)-butanone-1, dimethyl-1,2-diphenyl lehan-1-one, benzophenone or a combination thereof.

15. The method of claim 13, wherein the step of exposing the coated pattern of metal nanoparticle composition to an array of pulsed light emitting diodes (LEDs) is preceded or occurs simultaneously with a step of removing the solvent.

16. An ink jet printer, comprising: a print head disposed on a print carriage in communication with a processor, adapted to form the pattern of the coating composition comprising the metal nanoparticles of claim 1 on the substrate; and the array of pulsed light emitting diodes (LEDs), the printing carriage configured to move the substrate at the predetermined velocity.

17. The inkjet printer of claim 16, wherein the array of pulsed light emitting diodes (LEDs) is coupled to a frame configured to provide variable angle off normal between the array of pulsed light emitting diodes (LEDs) and the substrate.

\* \* \* \* \*